US009127890B2

(12) United States Patent
Garot

(10) Patent No.: US 9,127,890 B2
(45) Date of Patent: Sep. 8, 2015

(54) ANCHORING MEANS

(75) Inventor: Wouter Garot, The Hague (NL)

(73) Assignee: Wouter Garot, The Hague (NL)

( * ) Notice: Subject to any disclaimer, the term of this patent is extended or adjusted under 35 U.S.C. 154(b) by 934 days.

(21) Appl. No.: 13/266,771

(22) PCT Filed: Apr. 26, 2010

(86) PCT No.: PCT/NL2010/050232
§ 371 (c)(1),
(2), (4) Date: Oct. 27, 2011

(87) PCT Pub. No.: WO2011/038252
PCT Pub. Date: Mar. 31, 2011

(65) Prior Publication Data

US 2012/0294694 A1 Nov. 22, 2012
US 2013/0343832 A9 Dec. 26, 2013

(30) Foreign Application Priority Data

Apr. 29, 2009 (NL) ..................................... 1036914

(51) Int. Cl.
*F16B 37/00* (2006.01)
*F27D 1/14* (2006.01)

(52) U.S. Cl.
CPC ..................................... *F27D 1/141* (2013.01)

(58) Field of Classification Search
CPC ....... A01B 12/006; F27D 1/141; F16B 37/02; F16B 37/04
USPC ......................................... 411/427, 435, 544
See application file for complete search history.

(56) References Cited

U.S. PATENT DOCUMENTS

| | | | | |
|---|---|---|---|---|
| 1,899,715 A * | 2/1933 | Olson | ........................... | 411/176 |
| 2,381,352 A * | 8/1945 | Hotchkin | ...................... | 411/276 |
| 2,435,079 A * | 1/1948 | Hotchkin | ...................... | 411/167 |
| 2,452,184 A * | 10/1948 | Cole | ........................ | 285/154.1 |
| 2,758,627 A * | 8/1956 | Randall | ......................... | 411/284 |
| 3,507,182 A * | 4/1970 | Tinnerman | .................... | 411/429 |
| 3,691,897 A * | 9/1972 | Mullaney | .......................... | 411/8 |
| 4,536,116 A * | 8/1985 | Murray | ......................... | 411/427 |
| 4,990,044 A * | 2/1991 | Kimak | .......................... | 411/427 |
| 5,083,424 A | 1/1992 | Becker | | |

(Continued)

FOREIGN PATENT DOCUMENTS

| | | |
|---|---|---|
| EP | 0530895 | 3/1993 |
| FR | 2422919 | 11/1979 |
| JP | 11183041 | 7/1999 |

OTHER PUBLICATIONS

International Search Report of PCT/NL2010/050232 dated Jun. 23, 2010.

*Primary Examiner* — Gary Estremsky
(74) *Attorney, Agent, or Firm* — Rankin, Hill & Clark LLP

(57) ABSTRACT

The invention relates to an anchoring means for providing a fireproof and/or wear resistant lining on an object made of metal, wherein the build-up of a polygonal folded base portion is intended to be fixed to the object by means of a to the object welded pin, which is provided with an anchoring thread for receiving a part attached to a polygonal mid section of the anchoring means, comprising an internal thread, wherein lips which extend transversely to said polygonal base portion, join the edges of said base portion, which lips are bended over an angle with respect to said mid section and having mutually enclosing bending lines.

8 Claims, 1 Drawing Sheet

(56) References Cited

U.S. PATENT DOCUMENTS 5,139,379 A * 8/1992 Hasan et al. .................. 411/368
5,353,503 A * 10/1994 Garot ........................... 29/897.3
5,407,313 A * 4/1995 Bruins et al. .................. 411/544

* cited by examiner

ANCHORING MEANS

The invention relates to an anchoring means for providing a fireproof and/or wear resistant lining on an object made of metal, wherein the build-up of a polygonal folded base portion is intended to be fixed to the object by means of a to the object welded pin, which is provided with an anchoring thread for receiving a part attached to a polygonal mid section of the anchoring means, comprising an internal thread, wherein lips which extend transversely to said polygonal base portion, join the edges of said base portion, which lips are bended over an angle with respect to said mid section and having mutually enclosing bending lines.

Such an anchoring means is known from the Dutch patent 193.073. In this known embodiment a relatively large mid section and perpendicular to this mid section folded short arms or lips are applied.

As such this known anchoring means suffices, but with some lining materials and/or under difficult working conditions when applying the lining material on objects it may happen that the space between the anchoring means and the object is not thoroughly filled with lining material and underneath the anchoring means a non filled space or "air chamber" remains, which is unwanted.

According to the invention arms interconnected with the mid section of the anchoring means are bend with respect to the mid section over an angle of less than 90°, whereas the free ends of the arms interconnected with the mid section are bended with respect to the arms such that the free ends extend parallel to the plains, that are positioned in essence perpendicular to a plain extending parallel to the mid section. Under the term "bended over an angle" it is clearly meant that the angle is significantly larger then 0°, i.e. at an angle of about 0° one cannot speak of "bending". As a consequence the term "bended over an angle of less than 90°" will inevitably refer to an angle between "significantly larger than 0° and smaller than 90°", such as between 5° and 90°.

In practise it has been experienced that for this embodiment of the anchoring means according to the invention applying the lining material effectively between the given object and the anchoring means can be established without danger of remaining "air chambers" between the anchoring means and the object to which the anchoring means is applied, such that the lining applied is effected very effectively.

The invention will be explained in detail with respect to the accompanying figures.

Figure 1:
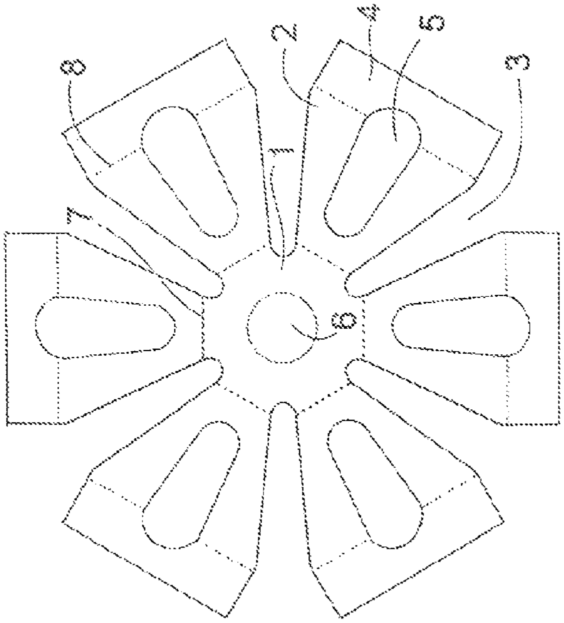
FIG. 1 shows a top view of a blanked out flat plate part, from which the anchoring means is being manufactured by folding the plate parts.

The starting piece shown in FIG. 1 for forming the anchoring means is obtained by blanking out a polygonal plate section or starting plate. Therein the starting piece is build up of a multigonal mid section 1, in the embodiment shown being a substantially hexagonal mid section. It may be clear that also other multigonals are considered, such as quadragonal, pentagonal, and octagonal. A too small or too large number of arms will not benefit the functionality and robustness of the anchoring means. To the mid section 9 six legs 2, forming one part with the mid section, link to the circumferal edge of the mid section, which legs are separated from one another by blanked out slots 3. Therein the width of each leg 2 increases gradually in a direction turned away from the mid section 1, whereas the free ends 4 of legs 2 have a rectangular form. An increasing width provides amongst others a improved accessibility, whereby air chambers are prevented, and further sufficient robustness. A rectangular form provides in particular a good fixture with the base. In each of the legs a further slot like hole 5 is formed by blanking out in a longitudinal direction of the leg. The slot like holes preferably have a relative surface, with respect to that of the legs, which is between 30 and 100% thereof, such as 50%. This provides a good accessibility and maintenance of robustness. In the hart of the mid section 1 a round hole 6 is applied.

Figure 2:
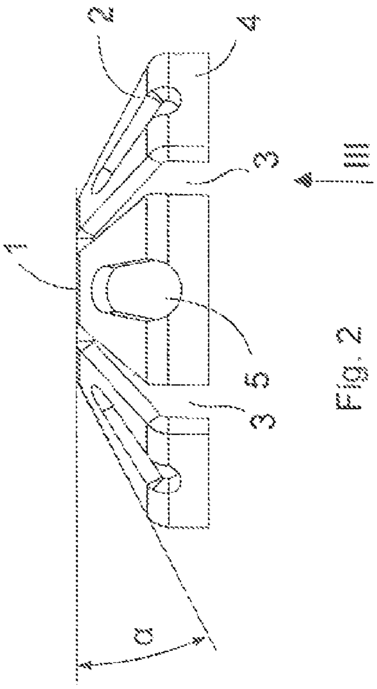
FIG. 2 shows a side view of an anchoring means.
Figure 3:
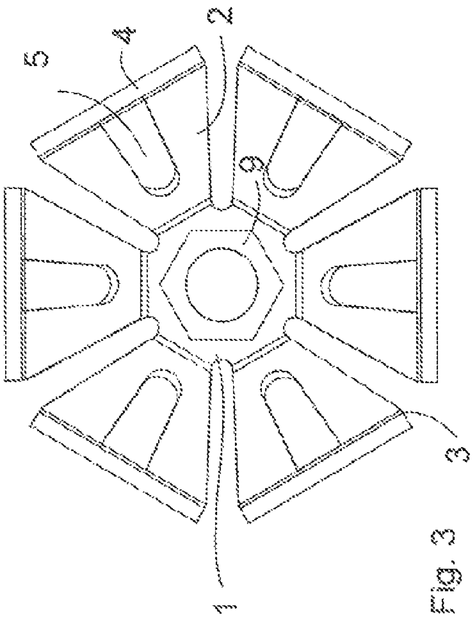
FIG. 3 shows a view of the anchoring means shown in FIG. 2 in the direction according to arrow III in FIG. 2.

For the manufacturing of the anchoring means as shown in FIGS. 2 and 3 the legs 3 are bended over the bending lines 7 with respect to the mid section 1 as is schematically indicated in FIG. 1 over an angle α smaller than 90°, but significantly larger than 0°, preferably between 20° and 40°, such as somewhat smaller than 30°. Other angles will not be functional, in a sense that for instance air chambers will remain. Further an anchoring means having larger angles is difficult to manufacture, and it is also more sensitive to breakage. In comparison to the anchoring means as disclosed in NL 193.073 there are important differences. A further advantage of the present anchoring means is that the concrete is easier to be positioned. This reduces the chance of mistakes when positioning, such as the appearance of air chambers, insufficient attachment, increased sensitivity to breakage, etcetera. As a consequence less or no anchoring means have to be removed and placed again.

A further important difference in comparison to the anchoring means disclosed in NL 193.073 is that the present free ends extend parallel to planes, which are substantially perpendicular to a plane extending parallel to the mid section. Also this difference provides the advantages mentioned above.

The free ends 4 of legs 2 are bended with respect to legs 2 along folding lines 8 schematically shown in FIG. 1 in such a way that the free ends 4 of legs 2 extend parallel to plains, which extend perpendicular to a plain which is parallel to the mid section 1. The length of a part of a leg in between folding legs 7 and 8 is in a radial direction measured from the hart of the hole 6 about equal to the distance between two folding lines 7 which are positioned opposing each other, and limiting the mid section 1. Such a length provides extra robustness and stiffness to the construction, as well as an improved manageability. The functionality thereof is as a consequence improved. Also from a aesthetic point of view the present embodiment appears neat and tidy.

In an example the plate section had a thickness of between 1.2 mm and 3.0 mm, preferably a thickness of between 1.5 mm and 2.0 mm. A too large thickness has as a consequence that the present anchoring means is difficult or not manageable for a person that is applying the anchoring means. A too small thickness has as a consequence that the anchoring means is for example mechanically too weak.

As is shown further in FIG. 3 between the bended legs 2 and the mid section 1 a connection part in the form of a nut 9 is welded in the area of a hole 6 being formed in the mid section.

Figure 4:
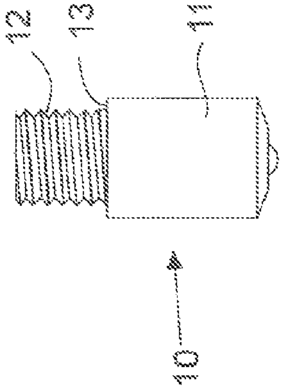
FIG. 4 shows a pin being used for attaching an anchoring means to an object.

For the attachment of the anchoring means to an object formed out of metal, which is to be applied with a fire proof and/of a wear resistant lining material, use is made of pens or styles as is shown in FIG. 4.

Such a pin 10 is build from a massive shaft 11, which shaft forms a single part with an external screw thread 12 being provided thereon. Thereby the external diameter of the part 12 is smaller then the external diameter of the part 11, such that at the transition between parts 11 and 12 a collar 13 is formed.

For attaching of the required number of anchoring means to an object provided the lining pins 10 are being welded to the object with an end thereof turned away from the screw tread end 12, for instance by pressing the pins with a suitable tool against the wall and heating the ends of the pins that are to be welded.

Subsequently the anchoring means are applied to the pins which are welded to the object by screwing an anchor means on each pin using the nut 9 welded to each respectively anchoring means. By screwing the anchoring means to the pin the nut 9 will at a given moment come in contact with collar 13 whereby it is prevented that the anchoring means is screwed too far to pin 11 and further that the anchoring means is at a required distance in each instance with respect to the object to be lined and unwanted deformation of the anchoring means will be prevented.

In practice it is observed that in particular by the acute development of the relatively long arm 2 being connected to the mid section 1, that can resiliently diverse, the space in between the anchoring means and the object to be lined can effectively be filled with the lining material in an easy way as can be accomplished and the presence of optional air chambers can be prevented in the space between the anchoring means and the object to be lined.

The invention claimed is:

1. An anchor for providing a fireproof and/or wear resistant lining on an object made of metal, wherein the build-up of a polygonal folded base portion is intended to be fixed to the object by a to-the-object-welded-pin, which is provided with an anchoring thread for receiving an attachment part attached to a polygonal mid section of the anchor, comprising an internal thread, wherein legs which extend transversely to said polygonal base portion, join the edges of said base portion, which legs are bent over an angle with respect to said mid section and having mutually enclosing bending lines, characterised in that legs joined with the mid section of the anchor are bent with respect to the mid section over an angle between 20° and 40°, whereas free ends of the legs joined with the mid section are bent with respect to the legs such that the free ends extend parallel to planes that are positioned perpendicular to a plane extending parallel to the mid section.

2. The anchor according to claim 1, wherein the legs are bent with respect to the mid section over an angle between 20° and 30°.

3. The anchor according to claim 1, wherein measured in a radial direction the length of a first leg in between folding lines around which the first leg is bent with respect to the mid section and the folding line around which the free end of the first leg is bent with respect to the remaining part of the first leg is about equal to the distance between two folding lines which are positioned opposing each other and around which two other legs are bent with respect to the mid section.

4. The anchor according to claim 1, wherein the width of a first leg increases gradually in a direction extending away from the mid section.

5. The anchor according claim 1, wherein in a first leg a further slot like hole is provided in a longitudinal direction of the first leg.

6. The anchor according to claim 1, wherein a free end of a first has a rectangular form.

7. The anchor according to claim 1, wherein a plate section of the anchor has a thickness of between 1.2 mm and 3.0 mm.

8. The anchor according to claim 1, wherein a plate section of the anchor has a thickness of between 1.5 mm and 2.0 mm.

* * * * *

UNITED STATES PATENT AND TRADEMARK OFFICE

CERTIFICATE OF CORRECTION

PATENT NO. : 9,127,890 B2
APPLICATION NO. : 13/266771
DATED : September 8, 2015
INVENTOR(S) : Wouter Garot It is certified that error appears in the above-identified patent and that said Letters Patent is hereby corrected as shown below:

Claims

In Column 4, line 24, claim 5 after “according” insert --to--

In Column 4, line 25, claim 5 after “slot” delete “like hole”

In Column 4, line 28, claim 6 after “first” insert --leg--

Signed and Sealed this
Ninth Day of February, 2016

Michelle K. Lee

Michelle K. Lee
*Director of the United States Patent and Trademark Office*